(12) United States Patent
Buchegger

(10) Patent No.: US 7,874,042 B2
(45) Date of Patent: Jan. 25, 2011

(54) SPRING HINGE FOR SPECTACLES

(75) Inventor: Harald Buchegger, St. Konrad (AT)

(73) Assignee: Redtenbacher Präzisionsteile Ges.m.b.H., Scharnstein (AT)

(*) Notice: Subject to any disclaimer, the term of this patent is extended or adjusted under 35 U.S.C. 154(b) by 399 days.

(21) Appl. No.: 12/217,647

(22) Filed: Jul. 8, 2008

(65) Prior Publication Data
US 2009/0025179 A1 Jan. 29, 2009

(30) Foreign Application Priority Data
Jul. 27, 2007 (AT) .............................. A 1186/2007

(51) Int. Cl.
G02C 5/22 (2006.01)
(52) U.S. Cl. ................... 16/228; 351/153; 351/113
(58) Field of Classification Search ................ 16/228; 351/153, 113, 114, 111, 140, 158, 119, 41
See application file for complete search history.

(56) References Cited

U.S. PATENT DOCUMENTS

| | | | | |
|---|---|---|---|---|
| 4,689,851 A | * | 9/1987 | Beyer | 16/228 |
| 5,889,575 A | * | 3/1999 | Wang | 351/113 |
| 6,631,194 B2 | * | 10/2003 | Fukuoka | 381/113 |
| 7,350,271 B2 | * | 4/2008 | Genelot | 16/228 |
| 7,735,193 B2 | * | 6/2010 | Buchegger | 16/228 |
| 2002/0092960 A1 | * | 7/2002 | Hotellier | 248/560 |
| 2005/0086768 A1 | * | 4/2005 | Chang | 16/228 |
| 2006/0179609 A1 | * | 8/2006 | Huang | 16/228 |
| 2007/0169309 A1 | | 7/2007 | Buchegger | |
| 2007/0192991 A1 | | 8/2007 | Buchegger | |

FOREIGN PATENT DOCUMENTS

| | | | |
|---|---|---|---|
| AT | 502 196 | | 2/2007 |
| EP | 0 632 306 | | 1/1995 |
| EP | 1 335 236 | | 8/2003 |
| GB | 2268282 | A * | 1/1994 |
| WO | WO 2005/111699 | | 11/2005 |

* cited by examiner

Primary Examiner—Victor Batson
Assistant Examiner—Jeffrey O'Brien
(74) Attorney, Agent, or Firm—Collard & Roe, P.C.

(57) ABSTRACT

A spring hinge for spectacles is described having a central hinge lobe (4) guided so it is displaceable in a bow-side housing (1) in the bow longitudinal direction and having a U-shaped sliding part (3) projecting from the hinge lobe (4) in the displacement direction and engaging in a housing recess (2), which receives a coiled spring (10) between its two legs (7), which is supported at one end on the web (6) connecting the two legs (7) of the U-shaped sliding part (3) and at the other end on a buttress (11), which is held removably in the housing (1) by a rotational adjustment coaxial to the coiled spring (10), the hinge lobe (4) having a through opening (17) running coaxially to the coiled spring (10). To allow a narrow construction for the spring hinge, it is suggested that the buttress (11) inserted transversely to the displacement direction between the legs (7) of the sliding part (3) have a greater diameter than the through opening (17) provided in the hinge lobe (4) for the insertion of a tool for the rotational adjustment of the buttress (11).

3 Claims, 2 Drawing Sheets

SPRING HINGE FOR SPECTACLES

CROSS REFERENCE TO RELATED APPLICATIONS

Applicant claims priority under 35 U.S.C. §119 of Austrian Application No. A 1186/2007 filed Jul. 27, 2007.

FIELD OF THE INVENTION

The invention relates to a spring hinge for spectacles having a central hinge lobe guided so it is displaceable in a bow-side housing in the bow longitudinal direction and having a U-shaped sliding part projecting from the hinge lobe in the displacement direction and engaging in a housing recess, which receives a coiled spring between its two legs, which is supported at one end on the web connecting the two legs of the U-shaped sliding part and at the other end on a buttress, which is removably held in the housing by a rotational adjustment coaxial to the coiled spring, the hinge lobe having a through opening running coaxially to the coiled spring.

DESCRIPTION OF THE PRIOR ART

To be able to ensure simple assembly conditions with a low construction effort, without having to dispense with good guiding of the hinge lobe displaceable against spring force in a housing, in a spring hinge for spectacles having a U-shaped sliding part carrying the hinge lobe, whose legs receive a coiled spring between them, inserting the buttress required for the coiled spring engaging on the web of the U-shaped sliding part for the housing-side support through the hinge lobes into the housing and screwing it into a nut thread of the housing is known (AT 502 196 B1). As a result of these measures, in comparison to other known hinge springs (EP 1 335 236 A1), in which the sliding part must be inserted transversely to the displacement direction because of a buttress fixed on the housing, a housing closed around the circumference may be used, which represents an essential requirement for guiding of the hinge lobes with as little play as possible. However, it is disadvantageous that a comparatively wide central hinge lobe and thus a corresponding minimum width for the spring hinge are required for the insertion of the buttress through the through opening required through the hinge lobes.

SUMMARY OF THE INVENTION

The invention is thus based on the object of designing a spring hinge of the type cited at the beginning for spectacles in such a manner that the hinge width measured in the direction of the hinge axis may be significantly reduced, without having to dispense with a housing closed around the circumference having a buttress, which is detachable in the displacement direction, for the coiled spring.

The invention achieves the stated object in that the buttress inserted transversely to the displacement direction between the legs of the sliding part has a greater diameter than the through opening provided in the hinge lobe for inserting a tool for rotational adjustment of the buttress.

The insertion of the buttress for the coiled spring transversely to the displacement direction between the legs of the sliding part does not obstruct the assembly of the spring hinge in the displacement direction, because a premountable assembly unit results for the hinge lobes and the buttress inserted together with the coiled spring between the legs of the sliding part of the hinge lobe, which may be inserted in the displacement direction in the housing recess provided for this purpose. Because the buttress remains accessible through the through opening in the hinge lobe for a tool engagement, the buttress may be axially fixed with the housing after the insertion of the hinge lobe in the housing recess by a rotational adjustment, so that the sliding part of the hinge lobe is drawn into the housing until it stops by the coiled spring, which is supported on the buttress and engages on the web connecting the two legs and is held under pressure pre-tension. The diameter of the buttress inserted transversely to the displacement direction between the legs of the sliding part does not determine the diameter of the through opening in the hinge lobes running coaxially to the coiled spring, which must merely ensure the passage of a tool for the rotational adjustment of the buttress and therefore may have a correspondingly smaller diameter, with the result that the hinge lobes may be implemented as narrower and accordingly a more slender spring hinge may be manufactured.

In order that the rotational adjustment of the buttress may be made easier in particular when it is fixed in the housing with the aid of a tool, the through opening in the hinge lobe may form a rotational retainer for the buttress on the side of the sliding part, the buttress first being pressed into this rotational retainer because of its impingement by the coiled spring and being able to be twisted inside the rotational retainer coaxially to the through opening. The connection of the buttress to the housing may be reduced in a way known per se by screwing the buttress into a nut thread of the housing coaxial to the coiled spring axis. However, simpler assembly conditions result if the buttress has radial bolt projections, which work together like a bayonet fastener with a peripheral groove of the housing forming axial passages for the bolt projections. In this case, the buttress may be twisted stop-limited between a locking and an unlocking position.

BRIEF DESCRIPTION OF THE DRAWING

The object of the invention is illustrated as an example in the drawing. In the figures.

DESCRIPTION OF THE PREFERRED EMBODIMENT

Figure 1:
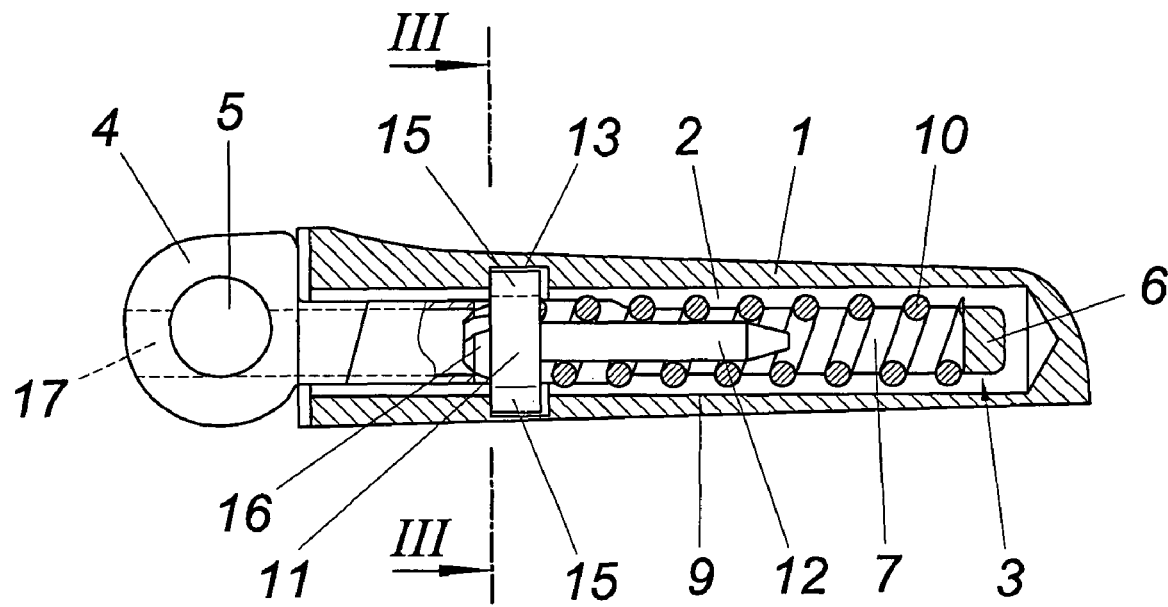
FIG. 1 show a spring-loaded hinge part of a spring hinge for spectacles according to the invention in a simplified longitudinal section.

The hinge part shown of a spring hinge for spectacles according to the invention has a housing 1, fastenable to a spectacle bow, having a housing recess 2 for a U-shaped sliding part 3, which is guided so it is displaceable in the housing recess 2 and is connected to a central hinge lobe 4. This hinge lobe 4 engages between two lateral hinge lobes of the other hinge part (not shown), and is connected to these lateral hinge lobes by a hinge axis, which penetrates the central hinge lobe 4 in a bearing eye 5. The sliding part 3 engaging in the housing recess 2 forms two parallel legs 7 connected to one another by a web 6, which engage in lateral guide sections 8 of the housing recess 2, as may be inferred from FIGS. 3 and 4. For reasons of simpler producibility, the housing recess 2 is essentially composed of three overlapping parallel holes, whose center is identified by 9.

The legs 7 of the sliding part 3 receive a coiled spring 10 between them, which is supported at one end on the web 6 of the sliding part 3 and at its other end on a buttress 11, which forms a guide pin 12 for the coiled spring 10 and is fixed in relation to the housing 1 in the axial direction. For this purpose, the housing 1 has a peripheral groove 13 in the area of the central hole 9 of the housing recess 2, which is provided with axial passages 14 for radial bolt projections 15 of the buttress 11, which is rotationally adjustable around the axis of the coiled spring, so that the bolt projections 15 of the buttress 11 may work together with the peripheral groove 13 in the housing recess 2 like a bayonet fastener.

Figure 2:
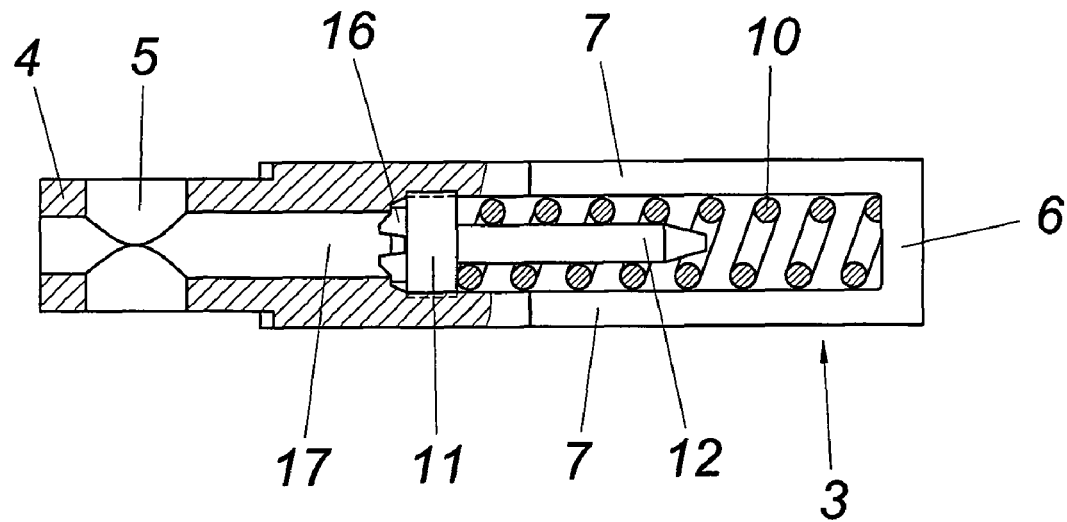
FIG. 2 shows an assembly unit, formed by the hinge lobe and the buttress inserted together with the coiled spring between the legs of the sliding part of the hinge lobe, in a partially cutaway top view.
Figure 3:
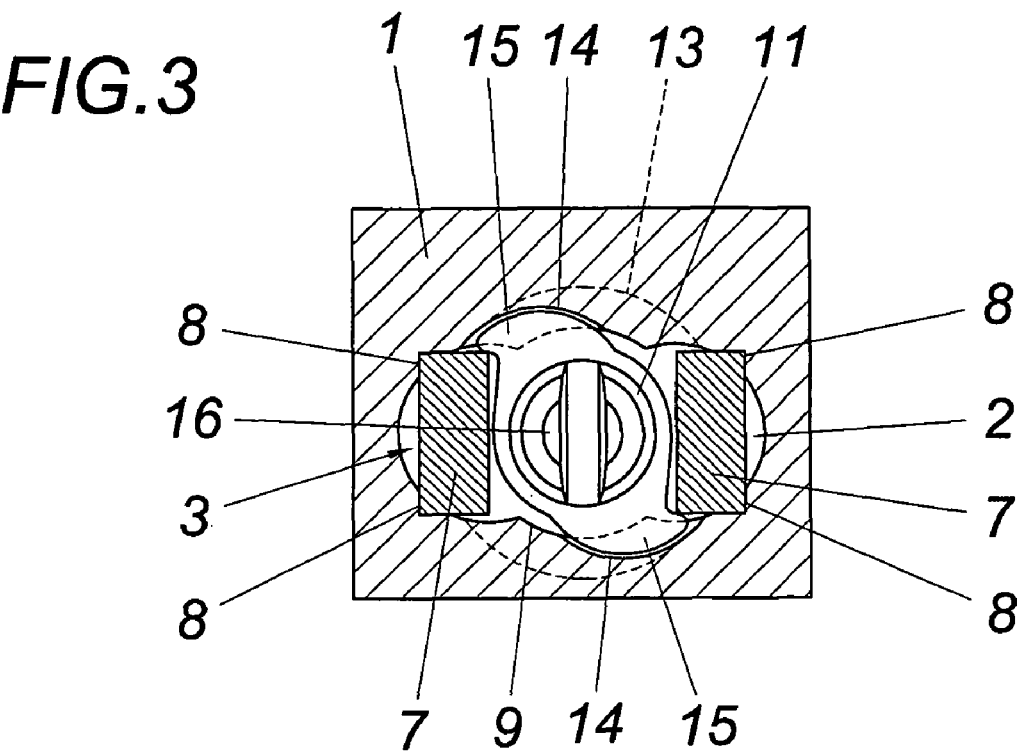
FIGS. 3 and 4 show a section along line III-III of FIG. 1 having the buttress in an unlocking and a locking position in an enlarged scale.
Figure 4:
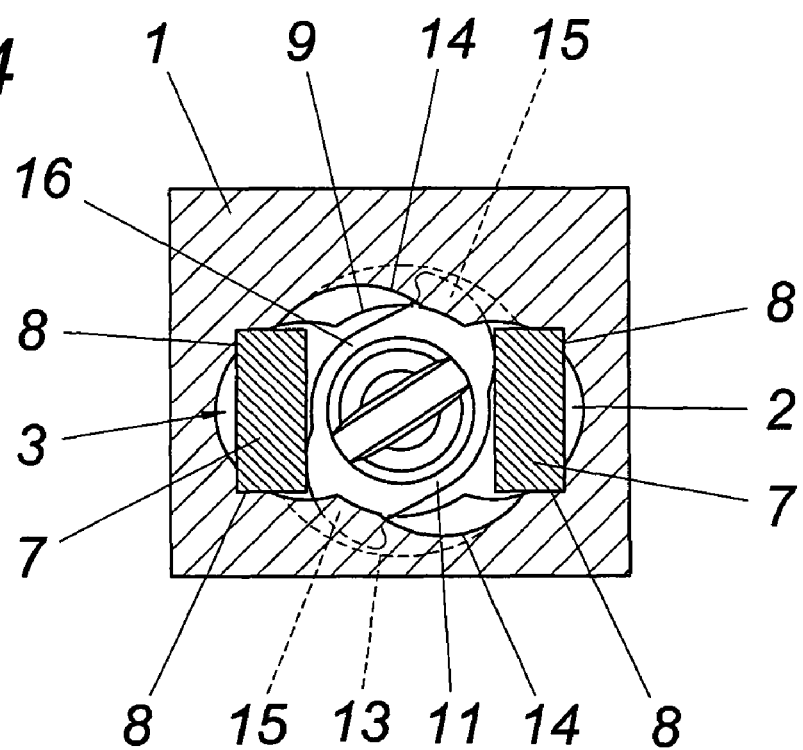

To mount the hinge part shown, the buttress 11 is first inserted between the legs 7 of the sliding part 3 with the coiled spring 10 pushed onto the guide pin 12, as shown in FIG. 2. The buttress 11 comes to rest having an actuating projection 16 for the engagement of a tool for the rotational adjustment of the buttress 11 in the area of a through opening 17 running transversely to the bearing eye 5 and oriented coaxially to the coiled spring 10, which forms a rotational retainer for the buttress 11 on the side of the sliding part 3, into which the buttress having the actuating projection 16 is pressed by the coiled spring 10 and retained so it is rotatable. The central hinge lobe 4 having the sliding part 3 and the buttress 11 inserted together with the coiled spring 10 between the legs 7 of the sliding part 3 thus results in a preassembled assembly unit, which may be inserted axially into the housing recess 2 from the open housing front side until the bolt projections 15 of the buttress 11 reach through the axial passages 14 in the area of the peripheral groove 13. This rotational position of the buttress is shown in FIG. 3. If the buttress 11 is now twisted with the aid of a tool, such as a screwdriver, which is inserted through the through opening 17 of the hinge lobe 4 until it engages in the actuating projection 16 of the buttress 11, in such a manner that the bolt projections 15 reach the area of the closed groove wall of the peripheral groove 13 from the area of the passages 14, the buttress 11 is locked like a bayonet in relation to the housing 1 as shown in FIG. 4, by which the assembly procedure is terminated. For unlocking, only a rotational adjustment of the buttress 11 in the opposite direction is required to be able to pull out the buttress 11 with its bolt projections 15 through the passages 14 back in the axial direction from the area of the peripheral groove 13.

Because the buttress 11 does not have to be inserted through the through opening 17 of the hinge lobe 4 into the housing 1, but rather this through opening 17 only is used for the axial passage of a tool for the rotational adjustment of the buttress 11, the diameter of this through opening 17 may be significantly smaller than that of the buttress 11, which opens up the possibility of implementing the central hinge lobe 4 as narrower and thus manufacturing spring hinges which have a lesser overall width in the direction of the hinge axis.

The invention claimed is:

1. A spring hinge for spectacles having a central hinge lobe (4) guided so it is displaceable in a bow-side housing (1) in the bow longitudinal direction and having a U-shaped sliding part (3) projecting from the hinge lobe (4) in the displacement direction and engaging in a housing recess (2), which receives a coiled spring (10) between its two legs (7), which is supported at one end on the web (6) connecting the two legs (7) of the U-shaped sliding part (3) and at the other end on a buttress (11), which is held removably in the housing (1) by a rotational adjustment coaxial to the coiled spring (10), the hinge lobe (4) having a through opening (17) running coaxially to the coiled spring (10), wherein the buttress (11) inserted transversely to the displacement direction between the legs (7) of the sliding part (3) has a greater diameter than the through opening (17) provided in the hinge lobe (4) for the insertion of a tool for the rotational adjustment of the buttress (11).

2. The spring hinge according to claim 1, wherein the through opening (17) in the hinge lobe (4) forms a rotational retainer for the buttress (11) on the side of the sliding part (3).

3. The spring hinge according to claim 1 , wherein the buttress (11) has radial bolt projections (15) which work together with a peripheral groove (13) of the housing (1) forming axial passages (14) for the bolt projections (15) like a bayonet fastener.

* * * * *